(12) United States Patent
Montanaro et al.

(10) Patent No.: US 10,093,583 B2
(45) Date of Patent: Oct. 9, 2018

(54) PROCESS FOR PRODUCING ZIRCONIA-BASED MULTI-PHASIC CERAMIC COMPOSITES

(71) Applicants: POLITECNICO DI TORINO, Turin (IT); INSTITUT NATIONAL DES SCIENCES APPLIQUEES DE LYON, Villeurbanne (FR); DOCERAM MEDICAL CERAMICS GMBH, Dortmund (DE); UNIVERSITE CLAUDE BERNARD LYON, Villeurbanne (FR); CENTRE NATIONAL DE LA RECHERCHE SCIENTIFIQUE, Paris (FR)

(72) Inventors: Laura Montanaro, Turin (IT); Paola Palmero, Turin (IT); Jerome Chevalier, Villeurbanne (FR); Helen Reveron, Villeurbanne (FR); Tobias Fuerderer, Dortmund (DE)

(73) Assignees: Politecnico Di Torino, Torino (IT); Centre National De La Recherche Scientifique, Paris (FR); Decoram Medical Ceramica CMBH, Dortmund (DE); Universite Claude Bernard Lyon, Villeurbanne (FR); Institut National Des Sciences Appliquees De Lyon, Villeurbanne (FR)

(*) Notice: Subject to any disclaimer, the term of this patent is extended or adjusted under 35 U.S.C. 154(b) by 100 days.

(21) Appl. No.: 15/119,717

(22) PCT Filed: Feb. 13, 2015

(86) PCT No.: PCT/IT2015/000036
§ 371 (c)(1),
(2) Date: Aug. 17, 2016

(87) PCT Pub. No.: WO2015/125167
PCT Pub. Date: Aug. 27, 2015

(65) Prior Publication Data
US 2017/0057876 A1    Mar. 2, 2017

(30) Foreign Application Priority Data
Feb. 21, 2014 (IT) ............... TO2014A0144

(51) Int. Cl.
*C04B 35/488* (2006.01)
*C04B 35/626* (2006.01)
(Continued)

(52) U.S. Cl.
CPC ............ *C04B 35/4885* (2013.01); *B01J 2/06* (2013.01); *C04B 35/488* (2013.01);
(Continued)

(58) Field of Classification Search
None
See application file for complete search history.

(56) References Cited

U.S. PATENT DOCUMENTS

| 7,407,690 B2 | 8/2008 | Prochazka et al. |
| 2005/0214466 A1 | 9/2005 | Prochazka et al. |

(Continued)

FOREIGN PATENT DOCUMENTS

| DE | 19733700 A1 | 4/1998 |
| JP | 5301767 B2 | 12/2007 |

(Continued)

*Primary Examiner* — Mary Lynn F Theisen
(74) *Attorney, Agent, or Firm* — Jeffrey G. Sheldon; Cislo & Thomas LLP

(57) ABSTRACT

A process is described, for producing zirconia-based multi-phasic ceramic composite materials, comprising the steps of: providing at least one ceramic suspension by dispersing at least one ceramic zirconia powder in at least one aqueous medium to obtain at least one matrix for such composite material; providing at least one aqueous solution containing (Continued)

one or more inorganic precursors and adding such aqueous solution to such ceramic suspension to surface modify such ceramic zirconia powder and obtain at least one additived suspension; quickly drying such additived suspension to obtain at least one additived powder; heat treating such additived powder to obtain at least one zirconia powder coated on its surface by second phases; and forming such zirconia powder coated on its surface by second phases.

11 Claims, 4 Drawing Sheets

(51) Int. Cl.
    *C04B 35/628* (2006.01)
    *B01J 2/06* (2006.01)
    *B82Y 30/00* (2011.01)

(52) U.S. Cl.
CPC .... *C04B 35/6264* (2013.01); *C04B 35/62655* (2013.01); *C04B 35/62675* (2013.01); *C04B 35/62823* (2013.01); *C04B 35/62886* (2013.01); *B82Y 30/00* (2013.01); *C04B 2235/3206* (2013.01); *C04B 2235/3213* (2013.01); *C04B 2235/3217* (2013.01); *C04B 2235/3222* (2013.01); *C04B 2235/3224* (2013.01); *C04B 2235/3225* (2013.01); *C04B 2235/3227* (2013.01); *C04B 2235/3229* (2013.01); *C04B 2235/3246* (2013.01); *C04B 2235/3262* (2013.01); *C04B 2235/443* (2013.01); *C04B 2235/606* (2013.01); *C04B 2235/6562* (2013.01); *C04B 2235/6565* (2013.01); *C04B 2235/6567* (2013.01); *C04B 2235/76* (2013.01); *C04B 2235/765* (2013.01); *C04B 2235/785* (2013.01); *C04B 2235/786* (2013.01); *C04B 2235/80* (2013.01); *C04B 2235/96* (2013.01)

(56) References Cited

U.S. PATENT DOCUMENTS

| | | | | |
|---|---|---|---|---|
| 2007/0179041 | A1* | 8/2007 | Muroi | B82Y 30/00 501/103 |
| 2009/0292366 | A1* | 11/2009 | Burger | C04B 35/4885 623/23.56 |
| 2011/0254181 | A1* | 10/2011 | Holand | A61K 6/0008 264/6 |
| 2012/0163744 | A1 | 6/2012 | Kahlman et al. | |
| 2012/0238437 | A1 | 9/2012 | Torrecillas San Millan et al. | |

FOREIGN PATENT DOCUMENTS

| | | |
|---|---|---|
| WO | 2008040813 A1 | 4/2008 |
| WO | 2008040815 A1 | 4/2008 |
| WO | 2011000390 A1 | 1/2011 |

* cited by examiner

PROCESS FOR PRODUCING ZIRCONIA-BASED MULTI-PHASIC CERAMIC COMPOSITES

CROSS-REFERENCE TO RELATED APPLICATIONS

The present Application is a national stage of International Patent Application No. PCT/IT20151/000036, titled "Process for Producing Zirconia-Based Multi-Phasic Ceramic Composites," filed Feb. 13, 2015, which claims priority from Italian Patent Application No. TO2014A000144, filed Feb. 21, 2014, the contents of which are incorporated in this disclosure by reference in their entirety.

BACKGROUND OF THE INVENTION

The present invention refers to a process for producing zirconia-based multi-phasic ceramic composites, with controlled composition, microstructure and properties.

Stabilized zirconia under tetragonal phase nowadays is one of the technologic ceramics with stronger industrial interest, due to its excellent mechanical (fracture strength, resistance to flexure, hardness, resistance to abrasion) and chemical-physical (optical properties, biocompatibility, corrosion resistance) properties, which allow its use also in the biomedical field. For example, zirconia stabilized by yttria ($Y$—$ZrO_2$) has a very high resistance to flexure, and a high hardness and fracture strength. However, this material can be subjected to severe degrade phenomena under hydrothermal conditions (at low temperature and with humidity) which can dramatically limit performance and lifetime of biomedical devices or of mechanical components made of zirconia.

An alternative is given by zirconia stabilized by cerium oxide ($Ce$—$ZrO_2$), which does not show such aging phenomena, but however has a grain size greater than $Y$—$ZrO_2$ and a following lower resistance to fracture. The recent scientific literature has demonstrated that it is possible to solve such problems thanks to the use of one or more reinforcing ceramic phases, one of which is with equiaxial morphology (whose role is limiting the growth of $Ce$—$ZrO_2$ during sinterization cycles and therefore increasing its resistance to fracture) while one is with elongated morphology (in order to further increase the material strength through crack deflection mechanisms).

The scientific literature has further recently demonstrated that it is possible to obtain excellent mechanical performances by adding to zirconia a second particellar phase or aluminium and magnesium spinel and a second phase with elongated morphology, other complex aluminates or other phases with magnetic-lead structure.

The chemical composition of the phases with elongated morphology is however often complex: in particular, elaboration and properties of such composite materials have been disclosed in some prior patents in which, in particular:

WO2008/040815 and US2009/0292366 disclose elaborating and using zirconia-based composite ceramics (stabilized both by yttria and by ceria), alumina and aluminates with elongated morphology, of a generic $REAl_{11}O_{18}$ composition (in which RE designates rare earth metals), containing lanthanum. Such materials are obtained through mixing of oxides, granulated via spray drier, pressed and sintered, and have a resistance to fracture ≥800 MPa (DIN EN ISO 6872), fracture strength ≥6 $MPa \cdot m^{1/2}$ (DIN CEN/TS 14425-5), elastic modulus ≤250 GPa (DIN EN 843 Part 2) and hardness ($HV_{0.5}$) ≤1500 (DIN 50113). The obtained material is useful for biomedical uses, such as tooth, hip, knee, shoulder or finger prostheses;

JP5301767 discloses elaborating zirconia-based composites (stabilized by ceria), alumina, lanthanum aluminate and manganese oxide at an increased resistance to flexure and fracture strength. Lanthanum aluminate is obtained by mixing lanthanum oxalate and transition alumina, calcinated and afterwards incorporated into the mixture with the other composing oxides;

WO2011/000390 and US2012/0163744 disclose elaborating and mechanical properties of zirconia-based composites (stabilized by yttria and ceria), alumina and stick metallic aluminates. The composite material is obtained through nebulization of a suspension containing the three oxides or zirconia, alumina and an aluminate precursor, afterwards pressed and sintered.

The prior art therefore proposes all processes in which the composite materials are obtained through mechanical mixing of their composing phases, introduced as powders.

Moreover, in prior art processes related to three-phase systems (for example, in the alumina-zirconia-YAG system) it is not possible to check the necessary stabilizer content to obtain, at ambient temperature, zirconia under a tetragonal phase, with the following stabilization of the cubic phase, much less interesting from the mechanical point of view. Consequently, such materials have limited mechanical properties and are scarcely interesting from the point of view of their industrial applicability.

The prior art further proposes some surface modification processes of ceramic powders, aimed to elaborate composite powders. In particular:

US2012/0238437 discloses a process for elaborating nanocomposites in the alumina-zirconia system, through the surface modification of commercial powders of alumina or zirconia with organic precursors of the second phases, through a surface reaction between metallic alkoxides and hydroxy groups of the matrix particles. Such process therefore implies the use of organic precursors and organic dispersing/solubilizing means, such as absolute ethanol. Moreover, the disclosed process is limited to preparing two-phase composites and gives rise to "common" microstructures wherein all phases have equiaxial morphology;

U.S. Pat. No. 7,407,690 discloses a method for a surface chemical-physical modification of titania powders for a treatment with sulphuric acid, in order to induce the formation of a surface layer of titanium phosphate. Afterwards, the suspension is added with a strong base (KOH) which transforms the phosphate into potassium titanate ($K_2TiO_3$). The process can still use an acidifying step (HCl) for transforming the surface titanate into a hydrous and gelled layer, with the generic formula $Ti(OH)_4$. Such product can be dried or further doped (with metals, as salts or in a colloidal shape, or organic compounds) to create a further surface layer, with a different composition, on the titania particles. Such process mainly consists in a mechanism for solving-surface precipitating titania, with formation of a gelled layer, in turn able to embed further organic/inorganic dopants. Moreover, also when alumina or zirconia are used as basic material, the disclosed process has to incorporate the formation of the surface layer of titanium phosphate.

Known processes for the surface modification of ceramic powders are therefore widely used to impart specific properties to composite powders to be obtained. Very rarely such processes are instead aimed to prepare composite powders, through their coating with chemical-physical methods or precipitating methods, in which an organic or inorganic precursor of the second phase is deposited onto the surface and converted into the final phase through a suitable heat treatment.

The processes for producing complex ceramic systems known in the art, however, still have some technologic problems as regards both composition and microstructural control. In fact, as results from above, composite (two- or multi-phasic) ceramics are generally produced through a conventional mechanical mixing process of their composing powders (or their precursors, but always in the form of oxide powders), generating materials that can have severe limitations as regards purity of the final phases, microstructure control (homogeneity), zirconia stabilization content. In order to solve such problems, the prior art provides for using a humid synthesis (sol-gel, co-precipitation, etc.) which however often gives rise to products which have a severe agglomeration of primary particles and a difficulty in reproducing the powder features when the process is implemented on an industrial scale.

SUMMARY OF THE INVENTION

Therefore, object of the present invention is solving the above prior art problems by providing a process for producing composite and nanocomposite ceramic materials, in particular aimed for preparing zirconia-based oxide ceramics (preferably stabilized by cerium oxide), containing two or more secondary phases, such secondary phases being suitably selected in order to increase mechanical properties, duration and reliability of zirconia, allowing to obtain materials and components which can be applied in multiple environments (biomedical sector, mechanical components, cutting tools, etc.).

Another object of the present invention is providing a process for producing zirconia-based multi-phasic ceramic composites which makes it possible to strictly control and modulate multiple parameters, such as content of stabilizing oxide in zirconia matrix, chemical composition of phases and their morphology, material microstructure, final (physical, optical, mechanical) properties.

Moreover, an object of the present invention is providing a process for producing zirconia-based multi-phasic ceramic composites, which allows both checking the concentration of stabilizer for the zirconia matrix with 0.1% (or lower) variation rates, and obtaining all final phases with their due purity and stoichiometry, even in case of multi-cation phases.

Another object of the present invention is providing a process for producing zirconia-based multi-phasic ceramic composites which instead guarantees a contact and mixing level which is narrower than what is proposed by the prior art, since only the zirconia matrix is used as powder (possibly nanometric) well dispersed into an aqueous medium, in which precursor metallic salts of the second phases are dissolved.

Moreover, an object of the present invention is providing a process for producing zirconia-based multi-phasic ceramic composites which comprises a drying step capable of allowing to obtain "soft" granules, lacking aggregates and therefore able to be easily dispersed in an aqueous suspension.

Another object of the present invention is providing a process for producing zirconia-based multi-phasic ceramic composites which, through a suitable modification of some process parameters, such as, for example, chemical composition of the aqueous solution to be mixed with the ceramic suspension, concentration of the same solutions and suspensions, pre-heat treatment of doped powders, allows easily modulating in a controlled way the composition and microstructural powder parameters, in order to optimize the final material properties in view of their specific applications.

The above and other objects and advantages of the invention, as will appear from the following description, are obtained with a process as claimed. Preferred embodiments and non-trivial variations of the present invention are the subject matter of the dependent claims.

It is intended that all enclosed claims are an integral part of the present description.

It will be immediately obvious that numerous variations and modifications (for example related to shape, sizes, arrangements and parts with equivalent functionality) can be made to what is described, without departing from the scope of the invention as appears from the enclosed claims.

BRIEF DESCRIPTION OF THE DRAWINGS

The present invention will be better described by some preferred embodiments thereof, provided as a non-limiting example, with reference to the enclosed drawings, in which.

DETAILED DESCRIPTION OF PREFERRED EMBODIMENTS

Figure 1:
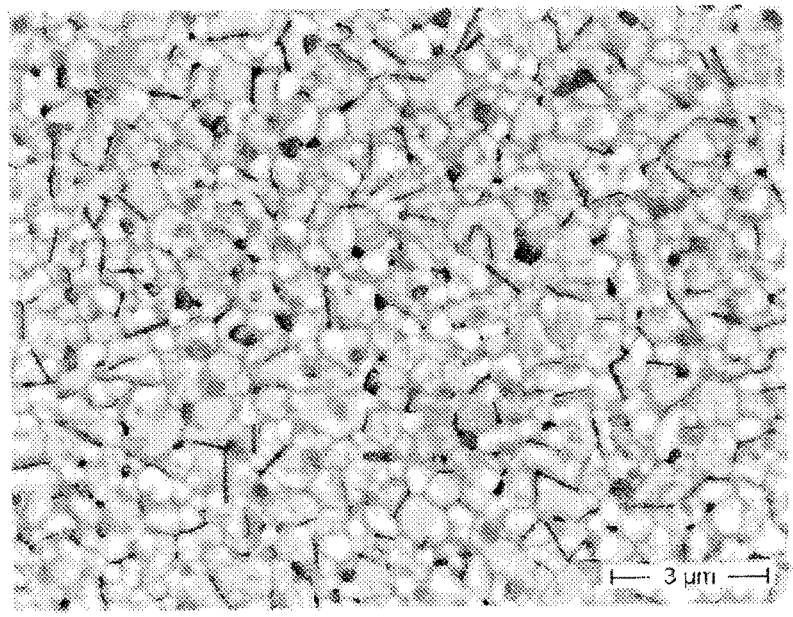
FIG. 1 shows a microstructure of a material sintered through a step of the process according to the present invention.

In particular, the process for producing zirconia-based multi-phasic ceramic composite materials comprises the steps of:

a) providing at least one ceramic suspension A by dispersing at least one ceramic zirconia powder in at least one aqueous medium to obtain at least one matrix for such composite material;

b) providing at least one aqueous solution B containing one or more inorganic precursors and adding such aqueous solution B to such ceramic suspension A to surface modify such ceramic zirconia powder and obtain at least one additived suspension C;

c) quickly drying such additived suspension C to obtain at least one additived powder D;

d) heat treating such additived powder D to obtain at least one zirconia powder coated on its surface by second phases; and e) forming such zirconia powder coated on its surface by second phases.

Preferably, the ceramic zirconia powder used in step a) of the process according to the present invention has a nanocrystalline structure and, advantageously, is of a commercially available type. The ceramic zirconia powder can be pure, namely free from stabilizing oxides, or contain one or more stabilizers in solid solution, and preferably cerium oxide, or yttrium oxide, or cerium oxide added with one or more other stabilizers, or yttrium oxide added with one or more other stabilizers. Cerium oxide, if present, can be contained in a molar ratio included between 5% and 15% with respect to zirconia. Yttrium oxide, if present, can be contained in a molar ratio included between 1% and 10% with respect to zirconia. The ceramic zirconia powder preferably has a nanometric or sub-micrometric grain size.

Preferably, the aqueous medium is deionized water and the ceramic zirconia powder is dispersed in such deionized water with a powder:water weight ratio included between 1:1 and 1:20.

Preferably, step a) further comprises substep a1) of dispersing the aqueous medium-ceramic powder suspension through at least one ball milling machine, with a powder: balls weight ratio included between 1:1 and 1:20. Preferably, the dispersion of substep a1) will be performed for a sufficient time to disgregate possible aggregates present in the powder, such time being preferably included between 1 and 50 h.

Still more preferably, step a) comprises the substep a2) of setting the pH value of the ceramic suspension A and keeping such value during the whole dispersion step a) of the process according to the present invention: in particular, the pH must be suitably chosen, namely in order to guarantee that there is no dissolution, not even partial, of powder and/or possible stabilizing oxides. According to the selected zirconia powder and to the second phases that have to be developed, the pH value will be set in a range included between 2 and 12 and kept as such during the whole dispersion step. From step a) of the process according to the present invention, a ceramic suspension A is thereby obtained, suitably dispersed and regulated at its necessary pH.

In particular, in step b) of the process according to the present invention, an aqueous solution B is prepared, containing the metallic inorganic precursors of the second phases that have to be developed in the final composite material. Preferably, such precursors comprise one or more inorganic salts, in particular chosen among anhydrous or hydrous chlorides, nitrates. Such inorganic precursors can comprise cerium, yttrium, aluminium, magnesium, strontium, lanthanum and/or manganese salts. The aqueous solution B preferably has a concentration included between 1 and 500 g/L, and the pH of such aqueous solution must be strictly controlled, in order to avoid the precipitation, even only partial, of such salts as hydroxides or other solid precipitates. In particular, step b) comprises substep b1) of dropwise adding the aqueous solution B to the ceramic suspension A, this latter one being kept under magnetic stirring. During the whole substep b1) of adding the aqueous solution B to the ceramic suspension A to obtain the additived suspension C, step b) can further comprise substep b2) of accurately checking the pH value of the ceramic suspension A, in order to avoid on one side the solubilization of the zirconia powder (or of the stabilizing oxides contained therein) and on the other side the precipitation of the metallic salts.

In particular, step c) of the process according to the present invention provides that the additived suspension C is instantaneously dried in a controlled way. Preferably, step c) can comprise substep c1) of nebulizing the additived suspension C at a temperature included between about 80° C. and about 200° C.: in particular, such substep c1) provides for supplying at least one nozzle of a nebulizer with such additived suspension C, such nozzle being adapted to transform additived suspension C into an aerosol of microdrops. The nebulizing step c1), performed in the temperature range included between about 80° C. and about 200° C., will guarantee the evaporation of the aqueous solvent of the additived suspension C in a very short time, on the order of milliseconds, obtaining additived powder D. In particular, the obtained additived powder D as product of the drying step c) of the process according to the present invention appears as granules with spherical morphology composed of zirconia powder, whose surface is uniformly coated with a layer containing the precursors of the second desired phase(s). Such surface layer has an essentially amorphous nature.

In particular, during step d) of the process according to the present invention, the additived powder D is subjected to specific heat treatments, performed with two different aims: the first one is inducing the thermal decomposition of the reaction by-products which are formed in the previous steps a), b) and c), and the second one is converting the surface amorphous layer, which coats the ceramic zirconia powders and which contains the metallic inorganic precursors of the second phases, in products with a certain degree of cristallinity. In order to obtain the above first aim, step d) of the process according to the present invention comprises a substep d1) of a first heat treatment which provides for heating such additived powder D at a temperature included between 200° C. and 800° C. for a time included between 1 and 20 hours, and with a cooling and heating rate included between 1 and 20° C./min. In order to obtain the above second aim, step d) of the process according to the present invention can further comprise a substep d2), following substep d1), of a second heat treatment which provides for heating the powder coming out of such substep d2) at a temperature included between 500° C. and 1300° C. for a time included between 1 and 20 hours, and with a cooling and heating rate included between 1 and 20° C./min. The product which is obtained from step d) of the process according to the present invention, and in particular from substeps d1) and d2), is a zirconia powder coated on its surface by second phases which can be amorphous, crystalline or partially amorphous and crystalline. If the surface products has a crystalline nature, they can have the chemical composition of the secondary final phases which have to be developed or have a metastable or intermediate composition. In particular, such zirconia powder coated on its surface is obtained as relatively soft granules, which can be easily dispersed in an aqueous medium (for example, through "ball-milling", in a time range included between 5 and 50 hours).

In particular, step e) of forming the zirconia powder coated on its surface by second phases can comprise a substep e1) of dry (pressing) or humid (casting in a die) forming of such zirconia powder coated on its surface by second phases and a following substep e2) of natural sinterization (at ambient pressure, in air) whose thermal cycle will be strictly controlled, in order to obtain ceramics with controlled theoretical density and final microstructure.

The present invention is clarified by the following Examples, though not being limited to such few Examples.

Purpose of these Examples is showing the capabilities of the process according to the present invention in checking and modulating multiple parameters, such as composition, microstructural, morphologic, physical, mechanical parameters, etc. Such check is performed through the simple, but targeted modification of some specific process parameters, such as for example the chemical composition of the saline solution, the concentration of some metallic salts in the same solution, the sinterization cycle of raw ceramics.

Example 1 shows the process capabilities in rigorously checking the content of ceria, a stabilizing oxide of the tetragonal zirconia, and the role of the cerium content on the physical and mechanical properties of sintered materials. In particular, this check allows modulating the mechanical (hardness, resistance to flexure, fracture strength) and physical (capability of zirconia of being transformed and its stability in an hydrothermal environment) properties, allowing to obtain an optimum in global performances of the ceramic composite.

The process according to the present invention further allows developing in situ the second and third desired phases, since these phases homogeneously crystallize on the whole surface of the commercial zirconia powder, through a suitable pre-heat treatment and/or sinterizing cycle of phases d) and e). Such aspect is shown in Example 2 proposed below, wherein the role of the sinterization cycle of substep e2) is pointed out in the microstructural and morphologic development of ceramic composites, possibly due to the in situ forming mechanism during the thermal process of step d).

EXAMPLE 1

Aqueous suspensions, 33% in weight, containing 100 g of commercial ceria-stabilized zirconia powder (stabilized with 10% mol of ceria) have been dispersed through ball-milling for about 15 hours, using zirconia balls (ball diameter equal to 2 mm; zirconia powder:balls weight ratio equal to 1:8). The suspensions pH has been take to 3 by addition of diluted hydrochloric acid.

Four aqueous solutions have been prepared, each one of which containing non-anhydrous aluminium nitrate, strontium nitrate, cerium ammonium nitrate. In these four solutions, the concentration of aluminium and strontium nitrate has been kept constant. On the contrary, the concentration of cerium and ammonium nitrate has been progressively increased. The concentration of metallic salts in the four formulations is shown in Table 1 that follows.

TABLE 1

| Formulation | $Al(NO_3)_3 \cdot 9H_2O$ (g/mL) | $Sr(NO_3)_2$ (g/mL) | $(NH_4)_2Ce(NO_3)_6$ (g/mL) |
|---|---|---|---|
| A | 1.5 | 0.06 | / |
| B | 1.5 | 0.06 | 0.08 |
| C | 1.5 | 0.06 | 0.165 |
| D | 1.5 | 0.06 | 0.246 |

The four saline solutions have been added to as many suitably dispersed ceramic suspensions. The four mixtures have been kept under magnetic stirring for two hours. The mixtures have afterwards been dried through a nebulizer, using a nebulization temperature equal to 140° C. The nebulized powders have been subjected to heat treatments; the first one performed at 600° C., for 1 hour; the second one at 1150° C., for 30 minutes.

The thermally-treated powders have been further dispersed through ball-milling, using deionized water as dispersing medium and milling balls made of zirconia. To the four formulations, a commercial dispersing agent (Duramax D3005) has been added in a concentration equal to 3% in weight with respect to the ceramic powder. The four dispersed suspensions have been cast in porous dies made of alumina. The raw bodies removed from porous dies have been dried for about a week under controlled temperature and humidity conditions. Upon reaching a constant mass, the raw ceramics have been subjected to a sinterization cycle performed at 1450° C. for 1 hour. In agreement with the different formulations used in the synthesis, the sintered materials have been called 1A, 1B, 1C and 1D.

The sintered materials have been subjected to the following physical characterizations:
1) measure of the sintered material density, through an Archimedes balance, according to the modes described in ASTM C373-88(2006) Standards;
2) analysis of present crystalline phases, through X-Ray Diffraction (DRX). The same analysis also allows determining fraction ($X_m$) and volume ($V_m$) of monocline zirconia on the surface of the sintered materials, applying the Toraya relationship:

$$V_m = \frac{1.311 \cdot X_m}{1 + 0.311 \cdot X_m} \quad (1)$$

$$X_m = \frac{I_m(\bar{1}11) + I_m(111)}{I_m(\bar{1}11) + I_t(111) + I_m(111)} \quad (2)$$

in which Ix (hkl) designates the intensity of the diffraction peak which corresponds to plane hkl of phase x, where x can designate the monocline (m) or tetragonal (t) phase.

The same analysis can be performed on the fracture surface of the materials, allowing to define the capability of zirconia to be transformed from the tetragonal phase to the monocline phase. The capability of transforming (T) is in fact defined by the following expression:

$$T = [(V_m)_f - (V_m)_p] \cdot 100 \quad (3)$$

in which $(V_m)_f$ and $(V_m)_p$ respectively designate the volume of monocline zirconia on the fracture surface and on the clean surface.
3) microstructural analysis, through Scan Electronic Microscope (SEM) and Field Emission Microscope (FESEM) and Transmission Electronic Microscope (TEM);
4) evaluation of zirconia stability under hydrothermal conditions, in agreement with ISO13356 Standards, by testing the materials in an autoclave (pressure of 2 bars, with vapor at a temperature of 134±2° C.) for 5 hours. The variation of the volume of monocline zirconia during the test has been evaluated through DRX analysis.

Moreover, the materials have been subjected to the following mechanical characterizations:
1) Vickers hardness, measured through a TESTWELL FV700 hardness meter, applying loads included between 5 and 30 kgf;
2) resistance to biaxial flexure, in agreement with the procedure described in International ISO 6872:2008(E) Standard, employing sintered disks having a diameter of about 12 mm and a thickness of about 1.2 mm;
3) fracture strength, in agreement with the procedure described in International ISO 6872:2008(E) Standard, using small sintered bars, having the following sizes: 40 mm×4 mm×3 mm.

The microstructural analysis has allowed pointing out that the described procedure enables obtaining composite sintered materials characterized by a high microstructural homogeneity. As an example, FIG. 1 shows the microstructure of sintered material 1C, allowing to observe the perfect distribution of all zirconia matrix phases, in addition to the absence of agglomerates as regards both the matrix (brighter contrast in FIG. 1) and the second phases (darker contrast in FIG. 1). It is further possible to observe, from the image in FIG. 1, that the zirconia matrix size is fine and homogeneous, and that the second phases show two different morphologies, since there are both grains with rounded, equiaxial morphology, and grains with elongated morphology.

Figure 2:
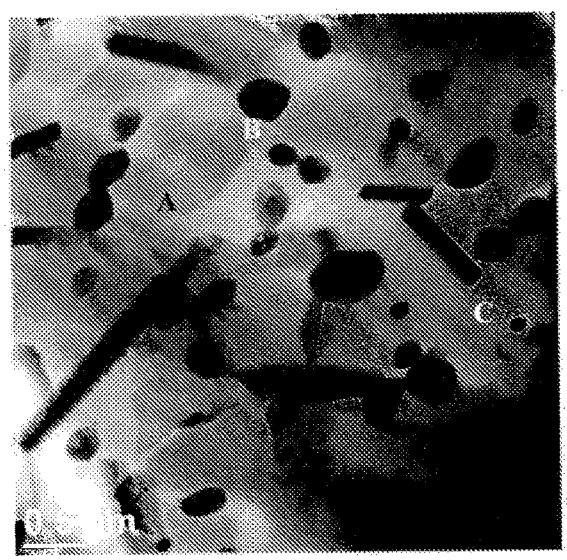
FIG. 2 shows a TEM micrograph of the sintered material of FIG. 1.

FIG. 2 instead shows a micrography obtained through electronic microscope in transmission of sintered material 1C. From such image, it is possible to better observe size and morphology of the matrix and of the second phases. Moreover, the microscope analysis has been accompanied by a chemical composition analysis, performed with a nanoprobe. Such analysis has allowed confirming that the phase with brighter contrast of FIG. 2 (point A) is composed only of zirconium, cerium and oxygen; the phase with darker contrast with rounded morphology (point B) is composed only of aluminium and oxygen; finally, the phase with darker contrast with elongated morphology (point C) is composed of aluminium, strontium and oxygen. Such information have allowed identifying, in the composite material, the three following ceramic phases: ceria-stabilized zirconia, alumina and strontium aluminate.

Through microscope characterization and image analysis, the microstructural parameters of the sintered materials have been determined. From data included in the following Table 2, it is possible to observe that the microstructural parameters of the four materials are very similar, both in terms of zirconia and alumina grain sizes, and in terms of mean length and form factor (meant as ratio between length and width of grains with elongated morphology) of the grains with elongated morphology composed of strontium aluminate.

TABLE 2

| Sintered material | Mean size of $ZrO_2$ grains (μm) | Mean size of $Al_2O_3$ grains (μm) | Mean length of $SrAl_{12}O_{19}$ grains(μm)/form factor |
|---|---|---|---|
| 1A | 0.6 ± 0.2 | 0.26 ± 0.08 | 0.7 ± 0.2/6 ± 2 |
| 1B | 0.6 ± 0.2 | 0.3 ± 0.1 | 0.6 ± 0.2/5 ± 2 |
| 1C | 0.5 ± 0.3 | 0.3 ± 0.1 | 0.6 ± 0.2/6 ± 2 |
| 1D | 0.7 ± 0.3 | 0.3 ± 0.1 | 0.9 ± 0.2/5 ± 2 |

Figure 3:
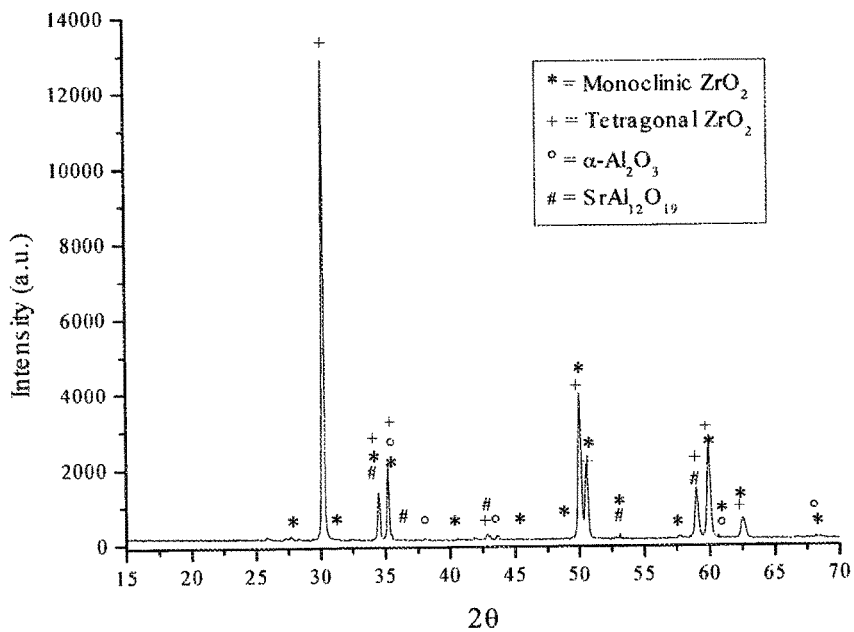
FIG. 3 shows a graph representing the X-ray diffraction spectrum of the sintered material of FIGS. 1 and 2.

The DRX analysis has confirmed that the materials deriving from the four formulations are composed only of ceria-stabilized zirconia, α-$Al_2O_3$ and $SrAl_{12}O_{19}$. FIG. 3 shows a diffraction spectrum of the sintered material 1C, including the identified crystalline phases. The DRX analysis has allowed determining the fraction of monocline zirconia present on the surface of the sintered materials, which resulted very low ($V_a$ included between 0.03 and 0.15).

Figure 4:
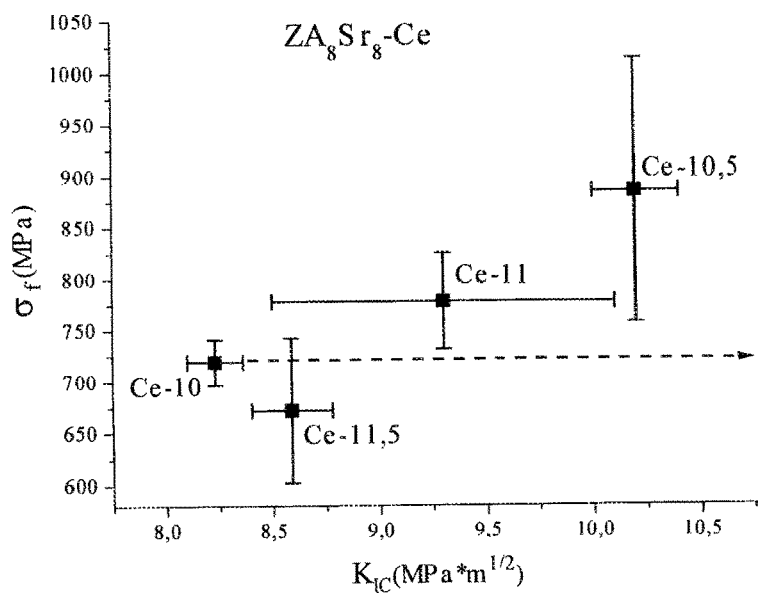
FIG. 4 show a graph representing the relationship between resistance to flexure and fracture strength as function of cerium content.

The following Table 3 includes some physical and mechanical data of the sintered materials. The relationship occurring between resistance to flexure and fracture strength is further shown in FIG. 4, which allows directly comparing the materials with different cerium content, allowing to identify the sintered material 1C as the material characterized by an optimum in mechanical properties (maximum resistance to flexure and fracture strength), but also in physical properties (optimum capability of being transformed of the zirconia under stress, but free from degrade under hydrothermal conditions, as shown by data in Table 3).

The Example proposed here allows clarifying the capability of the process according to the present invention in finely modulating in a controlled way the composition parameters, in turn effective on physical and mechanical properties of the multi-phasic ceramic composites developed here.

TABLE 3

| Sintered material | Vickers Hardness (Hv) | Resistance to Flexure (MPa) | Fracture Strength (MPa√m) | Capability of Being Transformed (%) | Hydrothermal Stability ($V_m$ after treatment in autoclave for 5 hours) |
|---|---|---|---|---|---|
| 1° | 1036 ± 8 | 719 ± 22 | 8.2 ± 0.1 | 70 | 46 |
| 1B | 995 ± 8 | 885 ± 128 | 10.2 ± 0.2 | 69 | 8.6 |
| 1C | 1058 ± 4 | 778 ± 47 | 9.3 ± 0.8 | 65 | 9 |
| 1D | 1080 ± 11 | 672 ± 70 | 8.6 ± 0.2 | 62 | 1 |

EXAMPLE 2

An aqueous suspension, 33% in weight, containing 100 g of commercial ceria-stabilized zirconia powder (stabilized with 10% mol of ceria) has been dispersed through ball-milling for about 15 hours, using zirconia balls (ball diameter equal to 2 mm; zirconia powder:balls weight ratio equal to 1:8). The suspension pH has been taken to 3 by adding diluted hydrochloric acid.

An aqueous solution containing non-anhydrous aluminium nitrate, magnesium nitrate hexahyrate, cerium ammonium nitrate has been prepared. The concentration of metallic salts dissolved in the four formulations is shown in the following Table 4:

TABLE 4

| Al $(NO_3)_3$•$9H_2O$ (g/mL) | Mg $(NO_3)_2$•$6H_2O$ (g/mL) | $(NH_4)_2Ce (NO_3)_6$ (g/mL) |
|---|---|---|
| 1.6 | 0.09 | 0.19 |

The saline solution has been added to the suitably dispersed ceramic suspension. The mixture has been kept under magnetic stirring for two hours and afterwards dried through a nebulizer, employing a nebulizing temperature equal to 140° C. The nebulized powder has been subjected to two heat treatments: the first one performed at 600° C., for 1 hour; the second one at 1150° C., for 30 minutes.

The heat treated powders have been further dispersed through ball-milling, employing deionized water as dispersing medium and zirconia milling balls. A commercial dispersing agent (Duramax D3005) has been added to the formulation in a concentration equal to 3% in weight with respect to the ceramic powder. The dispersed suspension has been cast in porous alumina dies. The raw bodies removed from the porous dies have been dried for about a week under controlled temperature and humidity conditions. Upon reaching a constant mass, raw ceramics have been subjected to two different sinterization cycles:

sintered material 2A has been treated at 1350° C., for 2 h; sintered material 2B has been treated at 1400° C. for 1 h.

Sintered materials have been subjected to the same physical, microstructural and mechanical characterizations defined in Example 1.

Figure 5A:
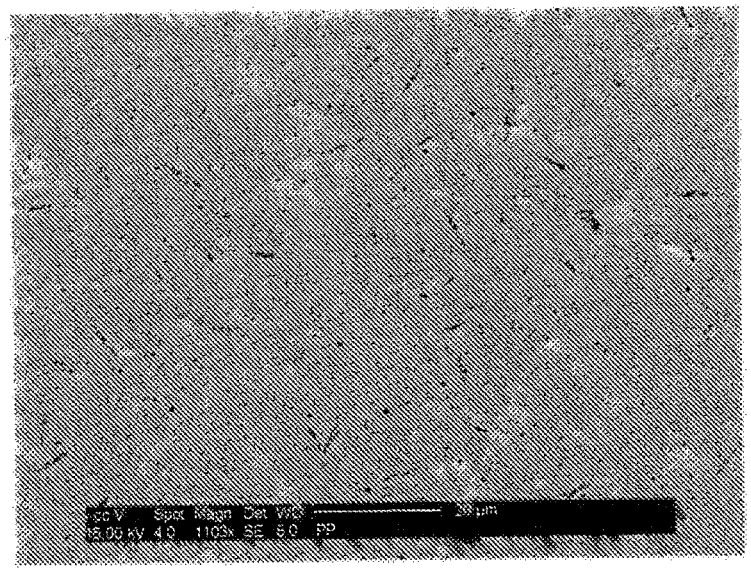
FIGS. 5a and 5b show SEM images of another material sintered through a step of the process according to the present invention, respectively at low and high magnification.
Figure 5B:
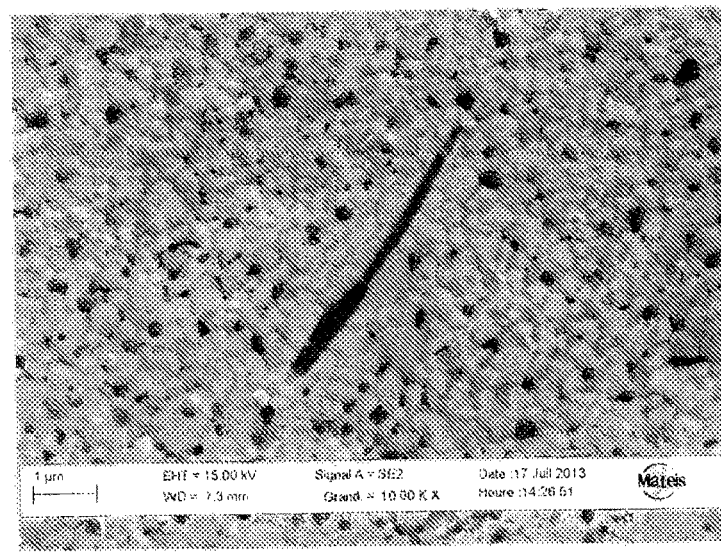

FIGS. 5a and 5b show the microstructure of sintered material 2A (images with different magnification), showing a homogeneous microstructure, characterized by a good distribution of the second phases in the ceramic matrix. The presence of a limited fraction of elongated morphologies, whose length is of few microns, can be observed.

Figure 6A:
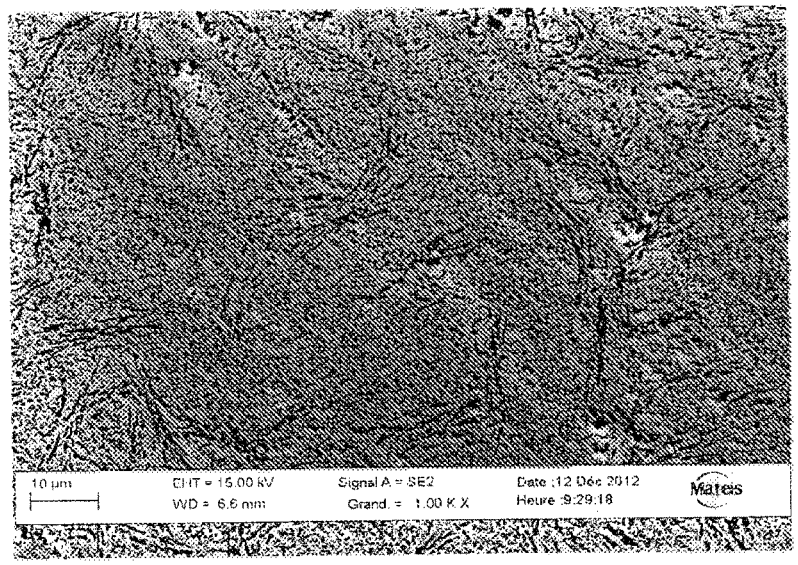
FIGS. 6a and 6b show SEM images of another material sintered through a step of the process according to the present invention, respectively at low and high magnification.
Figure 6B:
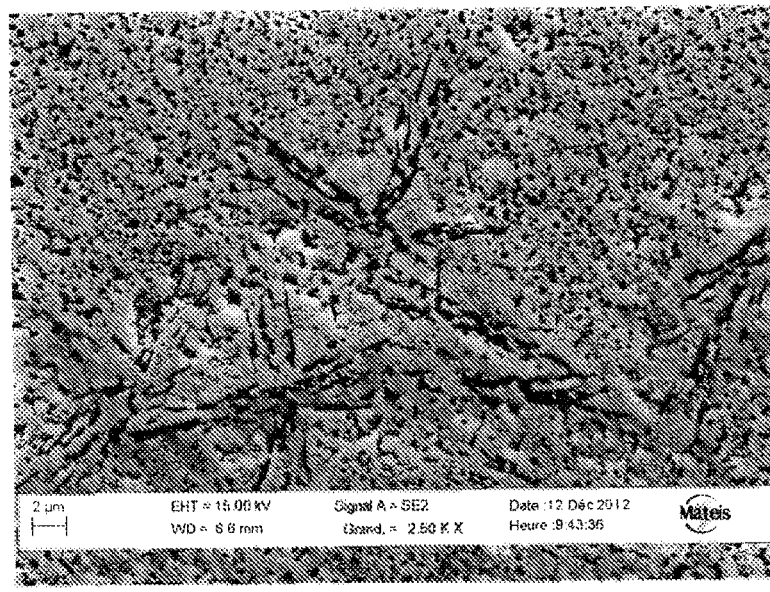

FIGS. 6a and 6b show the microstructure of sintered material 2B (images with different magnification), showing a homogeneous microstructure, characterized by a good distribution of the second phases in the ceramic matrix. The presence of an important fraction of grains having elongated morphology can be observed, whose length is of a few microns, with a high form factor.

The microstructural differences between the two materials are included in the following Table 5, both in terms of zirconia and alumina grain sizes, and in terms of mean length and form factor (meant as ratio between length and width of grains with elongated morphology) of grains with elongated morphology composed of magnesium aluminate.

The following Table 6 finally lists some physical and mechanical parameters of sintered materials.

TABLE 5

| Sintered material | Mean size of $ZrO_2$ grains (μm) | Mean size of $Al_2O_3$ grains (μm) | Mean length of $SrAl_{12}O_{19}$ grains (μm)/form factor |
|---|---|---|---|
| 2A | 0.4 ± 0.2 | 0.25 ± 0.06 | 2 ± 1/6 ± 1 |
| 2B | 0.8 ± 0.3 | 0.3 ± 0.1 | 4 ± 2/9 ± 3 |

TABLE 6

| Sintered material | Vickers Hardness (Hv) | Resistance to Flexure (MPa) | Fracture Strength (MPa√m) | Capability of Being Transformed (%) | Hydrothermal Stability ($V_m$ after treatment in autoclave for 5 hours) |
|---|---|---|---|---|---|
| 2A | 1085 ± 10 | 718 ± 132 | 7.1 ± 0.2 | 54 | n.a. |
| 2B | 1051 ± 11 | 866 ± 40 | 8 ± 1 | 57 | 1 |

The Example proposed here points out the role of a suitable sinterization cycle, versus the most suitable microstructural development. It is possible to note, in fact, the excellent mechanical properties of the sintered material at 1400° C./1 h, characterized by a high fraction of aluminates with elongated morphology, with high form factor. In turn, such microstructural check is made possible by the strategy of preparing the composite powders, and namely in the process according to the present invention, which implies the in situ formation of the secondary phases, which makes it possible to check and modulate the architecture of the composite materials due to suitable heat treatments.

Advantageously, the process according to the present invention as described above, with respect to what is proposed by the prior art, allows obtaining several advantages, among which:

the production of more complex ceramic materials, at the same time controlling the concentration of stabilizing materials for zirconia, number, composition and morphology of all second phases being present, and allowing to elaborate ceramic composites with increased physical and mechanical properties;

it is possible to obtain the tetragonal phase, but also to check the content of stabilizing materials at accurate levels. In order to reach such result, major is the role played by the process pH, which must be kept within a precise range. Through such check, it is possible to reach a balance in the liquid medium in which the metallic salts (precursors of the second phases) are completely dissociated into ions, instead avoiding the solubilization, even partial, of the zirconia matrix and of the oxide which stabilizes them. Reaching such balance allows checking the content of ceria in zirconia and, consequently, the final mechanical properties;

a strict mixing is obtained between ions in solution (precursors of the second phases) and ceramic nanoparticles (composite material matrix) in turn very well disagglomerated in an aqueous suspension, guaranteeing an excellent distribution of the second phases on the matrix powders, which cannot be obtained, for example, by mixing ceramic oxides or ceramic powders with precipitates (for example hydroxides) of second phases;

the homogeneity obtained in such mixture is "frozen" in dried products, due to almost instantaneous drying techniques ("flash"), in which the suspension is nebulized and the solvent instantaneously evaporated. Such technique prevents segregating the inorganic precursors which would occur during a slow drying in a stove, common drying practice for composite or doped powders. The strategies employed with controlled mixing and drying therefore bring about the elaboration of completely homogeneous microstructures, with an excellent distribution of all phases being present and free from agglomerates;

the surface modification of matrix powders with the precursors of the second phases is performed in an aqueous medium, contrary to coating processes of ceramic powders with organic precursors (alkoxides, acetates) or through sol-gel techniques which require organic mediums or solvents. Such strategy therefore is simpler and capable of being easily transferred on an industrial scale;

the surface modification technique is applied for the first time upon preparing multi-phasic ceramic systems (three or more composing phases), with non-conventional microstructure (containing both second particellar phases and with elongated morphology), also having a complex chemical composition (multi-cationic second phases, zirconia doped by accurate contents of stabilizing agent). In fact, even if the compositions to which the process according to the present invention has to be applied are not innovative per se, according to the known prior art, they are exclusively obtained through "standard" mechanical mixing processes of the composing oxides and their reaction at solid state to high temperature, with a reduced control on the microstructure (size and distribution of particles, morphologic development of phases) and product purity;

the process according to the present invention is versatile, and can be applied, upon request, to a wide range of compositions and microstructures;

by regulating the chemical composition of the starting saline solution and regulating the process pH in a well defined range, it is possible to check the content of cerium oxide in zirconia (down to variation rates of 0.1%, or less) and simultaneously obtain all reinforcing phases with the correct stoichiometry;

zirconia-based composite materials are obtained with excellent mechanical properties, increased reliability and duration. Moreover, the process according to the present invention is particularly versatile, since it allows simply modulating some physical and mechanical properties, by controlling some process parameters, in order to optimize the behavior depending on the specific field of application;

the process according to the present invention is relatively simple to implement on industrial scale, since it is composed of a limited number of process steps, which provide for the use of conventional techniques and instruments for elaborating ceramic materials. Moreover, all process steps are performed in an aqueous medium, without ever using organic solvents: this allows limiting the process costs and the environmental impact deriving therefrom;

the modulation of composition parameters is performed in a single process step, through the modification of the starting saline solution, thereby allowing not to modify the process itself. The obtained powders can be easily dispersed into an aqueous medium; fine and well disagglomerated powders can be easily sintered down to a theoretical density in conventional ovens (in air, without the help of pressure) and at moderate temperatures (1200° C.-1600° C.).

The invention claimed is:

1. A process for producing a zirconia-based multi-phasic ceramic composite material, the process comprising the steps of:
   a) providing at least one ceramic suspension by dispersing at least one ceramic zirconia powder in at least one aqueous medium to obtain at least one ceramic suspension;
   b) providing at least one aqueous solution containing one or more inorganic precursors and adding the aqueous solution to the ceramic suspension to surface modify the ceramic zirconia powder, thereby forming a surface modified ceramic zirconia powder;
   c) drying the surface modified ceramic zirconia powder to obtain an additive powder; through nebulization of the surface modified ceramic zirconia powder to an aerosol of micro-drops at a temperature between 80° C. and 200° C.; and
   d) heat treating the additive powder to obtain at least one zirconia powder coated on its surface by second phases thereby producing the zirconia-based multi-phasic ceramic composite material.

2. The process according to claim 1, wherein the ceramic zirconia powder is stabilized by an oxide, the oxide comprising cerium oxide or yttrium oxide.

3. The process according to claim 2, wherein the molar ratio of cerium oxide to ceramic zirconia powder is between 5% and 15%.

4. The process according to claim 1, wherein the aqueous medium is deionized water and the ceramic zirconia powder is dispersed in the deionized water with a powder to water weight ratio between 1:1 and 1:20.

5. The process according to claim 1, wherein step a) further comprises i) dispersing an aqueous medium-ceramic powder suspension through at least one ball milling machine, with a powder to balls weight ratio between 1:1 and 1:20, for between 1 and 50 hours, and ii) setting and maintaining a constant pH in the ceramic suspension during step a).

6. The process according to claim 1, wherein the inorganic precursors comprise one or more cerium, yttrium, aluminum, magnesium, strontium, lanthanum or manganese salts.

7. The process according to claim 1, wherein step b) further comprises i) adding the aqueous solution dropwise to the ceramic suspension while stirring the ceramic suspension, and ii) measuring a pH value of the ceramic suspension.

8. The process according to claim 1, wherein step d) further comprises i) heating the additive powder at a temperature between 200° C. and 800° C. for between 1 and 20 hours, and with a cooling and heating rate between 1 and 20° C./min, and ii) heating the heated additive powder at a temperature between 500° C. and 1300° C. for between 1 and 20 hours, and with a cooling and heating rate between 1 and 20° C./min.

9. The process according to claim 1, further comprising step e), step e) comprising naturally sintering the zirconia-based multi-phasic ceramic composite material, namely, sintering the zirconia-based multi-phasic ceramic composite material in air and at atmospheric pressure.

10. The process of claim 2, wherein the oxide comprises two or more stabilizers.

11. The process according to claim 2, wherein the molar ratio of yttrium oxide to ceramic zirconia powder is between 1% and 10%.

* * * * *